United States Patent
Oshins et al.

(10) Patent No.: US 12,314,564 B2
(45) Date of Patent: May 27, 2025

(54) SCALABLE CONTROLLER FOR MANAGING DATA STORAGES

(71) Applicant: Microsoft Technology Licensing, LLC, Redmond, WA (US)

(72) Inventors: Jacob Kappeler Oshins, Seattle, WA (US); Hari Daas Angepat, Redmond, WA (US); Yi Yuan, Redmond, WA (US); Vadim Makhervaks, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 28 days.

(21) Appl. No.: 17/950,955

(22) Filed: Sep. 22, 2022

(65) Prior Publication Data

US 2024/0103721 A1 Mar. 28, 2024

(51) Int. Cl.
*G06F 3/06* (2006.01)

(52) U.S. Cl.
CPC .......... *G06F 3/0607* (2013.01); *G06F 3/0629* (2013.01); *G06F 3/0679* (2013.01)

(58) Field of Classification Search
CPC ..... G06F 3/0607; G06F 3/0629; G06F 3/0679
See application file for complete search history.

(56) References Cited

U.S. PATENT DOCUMENTS

| | | | |
|---|---|---|---|
| 11,048,512 B1* | 6/2021 | Raj | G06F 9/5005 |
| 2018/0217951 A1* | 8/2018 | Benisty | G06F 13/1642 |
| 2020/0042246 A1* | 2/2020 | Maharana | G06F 3/0688 |
| 2020/0050470 A1* | 2/2020 | Guo | G06F 3/0664 |
| 2022/0311716 A1* | 9/2022 | Dutta | H04L 47/40 |
| 2023/0126265 A1* | 4/2023 | Zinger | G06F 13/1668 |
| | | | 710/107 |

* cited by examiner

*Primary Examiner* — Nanci N Wong

(57) ABSTRACT

Embodiments of the present disclosure include systems and methods for providing a scalable controller for managing data storages. A system includes a non-volatile memory controller comprising a set of data queues and a set of administrative queues. The system also includes a set of physical storages communicatively coupled to the non-volatile memory controller. A set of logical storages are created from the set of physical storages. A primary non-volatile memory controller is created from the non-volatile memory controller. The primary non-volatile memory controller comprising an administrative queue in the set of administrative queues, a first subset of the set of data queues, and a first subset of the set of logical storages. An extended non-volatile memory controller is created from the non-volatile memory controller. The extended non-volatile memory controller comprising a second subset of the set of data queues and a second subset of the set of logical storages.

20 Claims, 5 Drawing Sheets

SCALABLE CONTROLLER FOR MANAGING DATA STORAGES

BACKGROUND

The present disclosure relates to controllers for data storages. More particularly, the present disclosure relates to providing scalable non-volatile memory express (NVMe) controllers.

NVMe is a protocol for managing data stored in non-volatile data storages (e.g., solid-state drives (SSDs)). In particular, NVMe defines a specification for a logical-device interface as well as the command structures for accessing the non-volatile storage media of a computing device. As a logical-device interface, NVMe is designed to capitalize on the low latency and internal parallelism of solid-state storage devices.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for providing a scalable controller for managing data storages. In some embodiments, a computing system includes a scalable non-volatile memory controller and a set of physical storages (e.g., hard disk drives, solid state drives (SSDs), flash memory cards, etc.). The scalable non-volatile memory controller may include a set of hardware (e.g., administrative queues, data queues, interrupt table entries, etc.) for managing data storages. In addition, the scalable non-volatile memory controller can be configured with a set of logical storages that are implemented across the set of physical storages. To scale the scalable non-volatile memory controller, multiple non-volatile memory controllers (also referred to as extended non-volatile memory controllers) may be created from the scalable non-volatile memory controller. Each of the extended non-volatile memory controllers is allocated a portion of the set of hardware of the scalable non-volatile memory controller. Such an extended non-volatile memory controller can be allocated to a virtual machine executing on the computing system and serve as a non-volatile memory controller for the virtual machine. As more virtual machines are created on the computing system, additional extended non-volatile memory controllers may be created from the scalable non-volatile memory controller.

Figure 1:
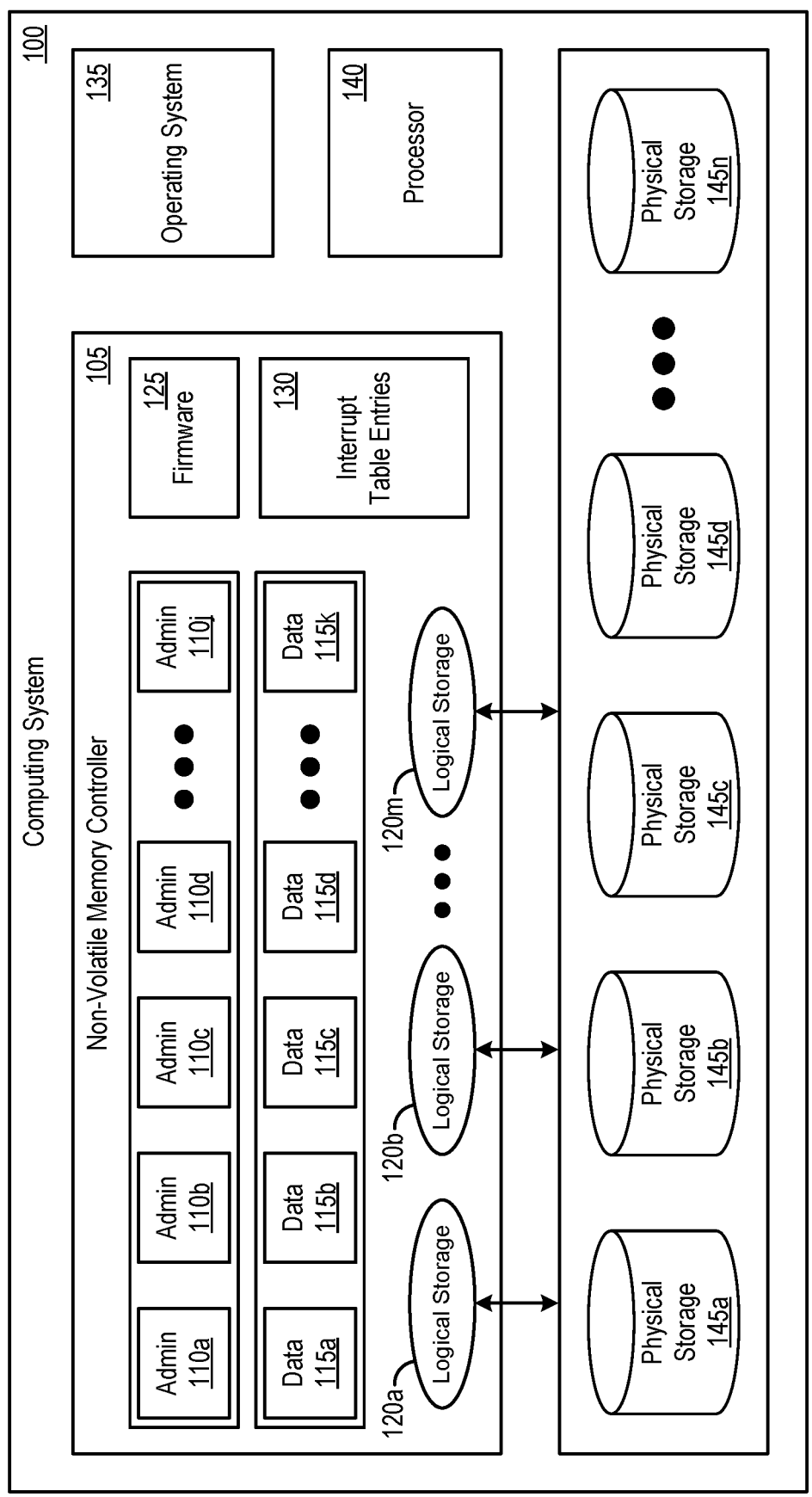
FIG. 1 illustrates a computing system according to some embodiments.

FIG. 1 illustrates a computing system 100 according to some embodiments. As shown, computing system 100 includes non-volatile memory controller 105, operating system 135, processor 140, and physical storages 145a-n. Each of the physical storages 145a-n may be a hard disk drive, an SSD, a flash memory card, or any other type of storage medium. While FIG. 1 shows physical storages 145a-n as part of computing system 100, one of ordinary skill in the art will appreciate that one or more of physical storages 145a-n may be external to computing system 100 (e.g., part of another computing device that is communicatively coupled to computing system 100, for example, via a network).

Non-volatile memory controller 105 is configured to manage data stored in physical storages 145a-n. For example, non-volatile memory controller 105 can facilitate the reading of data from and the writing of data to physical storages 145a-n. In some embodiments, non-volatile memory controller 105 is communicatively coupled to processor 140 via a communication bus (e.g., a peripheral component interconnect express (PCIe) communication bus). As illustrated in FIG. 1, non-volatile memory controller 105 includes administrative queues 110a-j, data queues 115a-k, logical storages 120a-m, firmware 125, and interrupt table entries 130.

Each of the administrative queues 110a-j is responsible for processing administrative commands. These commands may also be referred to as non-input/output (I/O) commands. For instance, each of the administrative queues 110a-j can receive commands from processor 140 (which processor 140 received from, e.g., operating system 135, an application operating on computing system 100, an application external to computing system 100, etc.). Once non-volatile memory controller 105 processes the command, non-volatile memory controller 105 may send processor 140 an interrupt message indicating completion of the command Examples of administrative commands include a command to create a data queue, a command to delete a data queue, a command to retrieve logs, a command to retrieve identifying information associated with non-volatile memory controller 105, a command for creating a logical storage, a command for deleting a logical storage, etc. In some embodiments, each of the administrative queues 110a-j is implemented as a pair of queues (e.g., an administrative submission queue for receiving commands and an administrative completion queue for transmitting messages indicating the completion of commands).

Each of the data queues 115a-k is configured to process I/O commands. For example, each of the data queues 115a-k may receive commands from processor 140 (which processor 140 received from, e.g., operating system 135, an application operating on computing system 100, an application external to computing system 100, etc.). Upon processing the command, non-volatile memory controller 105 can send processor 140 an interrupt message indicating completion of the command Examples of I/O commands include a command to read data from a logical storage 120, a command to write data to a logical storage 120, etc. In some embodiments, each of the data queues 115a-k is implemented as a pair of queues (e.g., a data submission queue for receiving commands and a data completion queue for transmitting messages indicating the completion of commands).

Each of the logical storages 120a-m is a logical storage implemented by one or more physical storages 145a-n. A logical storage can also be referred to as a virtual disk. In this example, each of the logical storages 120a-m was created in response to a command to create a logical storage that non-volatile memory controller 105 received from processor 140 via an administrative queue 110.

Firmware 125 is software executing on non-volatile memory controller 105 for managing administrative queues 110a-j, data queues 115a-k, and interrupt table entries 130. For instance, firmware 125 is responsible for managing the mappings between administrative queues 110a-j, data queues 115a-k, and interrupt table entries and the non-volatile memory controllers (e.g., extended non-volatile memory controllers) to which administrative queues 110a-j, data queues 115a-k, and interrupt table entries are allocated.

Interrupt table entries 130 provide a mechanism for non-volatile memory controller 105 to communicate with processor 140. For example, when a command is completed and placed in a data queue 115, non-volatile memory controller 105 may generate an interrupt message that includes the contents stored in the interrupt table entry in interrupt table entries 130 that is associated with the data queue 115. Then, non-volatile memory controller 105 sends the generated interrupt message to processor 140. In some embodiments, each data queue 115a-k is associated with a different interrupt table entry in interrupt table entries 130. In other embodiments, multiple data queues 115a-k can be associated with the same interrupt table entry in interrupt table entries 130.

Operating system 135 is software executing on computing system 100 that manages resources in computing system 100 and provides a defined set of functions and/or services for other software executing on computing system 100. Here, operating system 135 is configured to initialize non-volatile memory controller 105. To do so, operating system 135 may issue commands to enable administrative queues 110a-j. Then, operating system 135 uses one of the administrative queues 110 to initialize one or more data queues 115a-k and/or one or more logical storages 120a-m. As part of the initialization of non-volatile memory controller 105, operating system 135 can also populate interrupt table entries 130 with data. For instance, operating system 135 can write information in each of the interrupt table entries in interrupt table entries 130 that instruct how processor 140 is to respond when processor 140 receives the information (e.g., via an interrupt message). As an example, for an interrupt table entry in interrupt table entries 130 that is associated with a data queue 115, the information that operating system 135 writes in the interrupt table entry instructs processor 140 to execute a device driver associated with non-volatile memory controller 105. For this example, operating system 135 is configured to perform the aforementioned operations. In some embodiments, instead of operating system 135, a hypervisor configured for creating and managing virtual machines on computing system 100 performs the operations performed by operating system 135.

Processor 140 is responsible for executing operating system 135. Additionally, processor 140 handles interrupts received from non-volatile memory controller 105. For example, when processor 140 receives an interrupt message from non-volatile memory controller 105, processor 140 performs the instructions include in the interrupt message.

Figure 2:
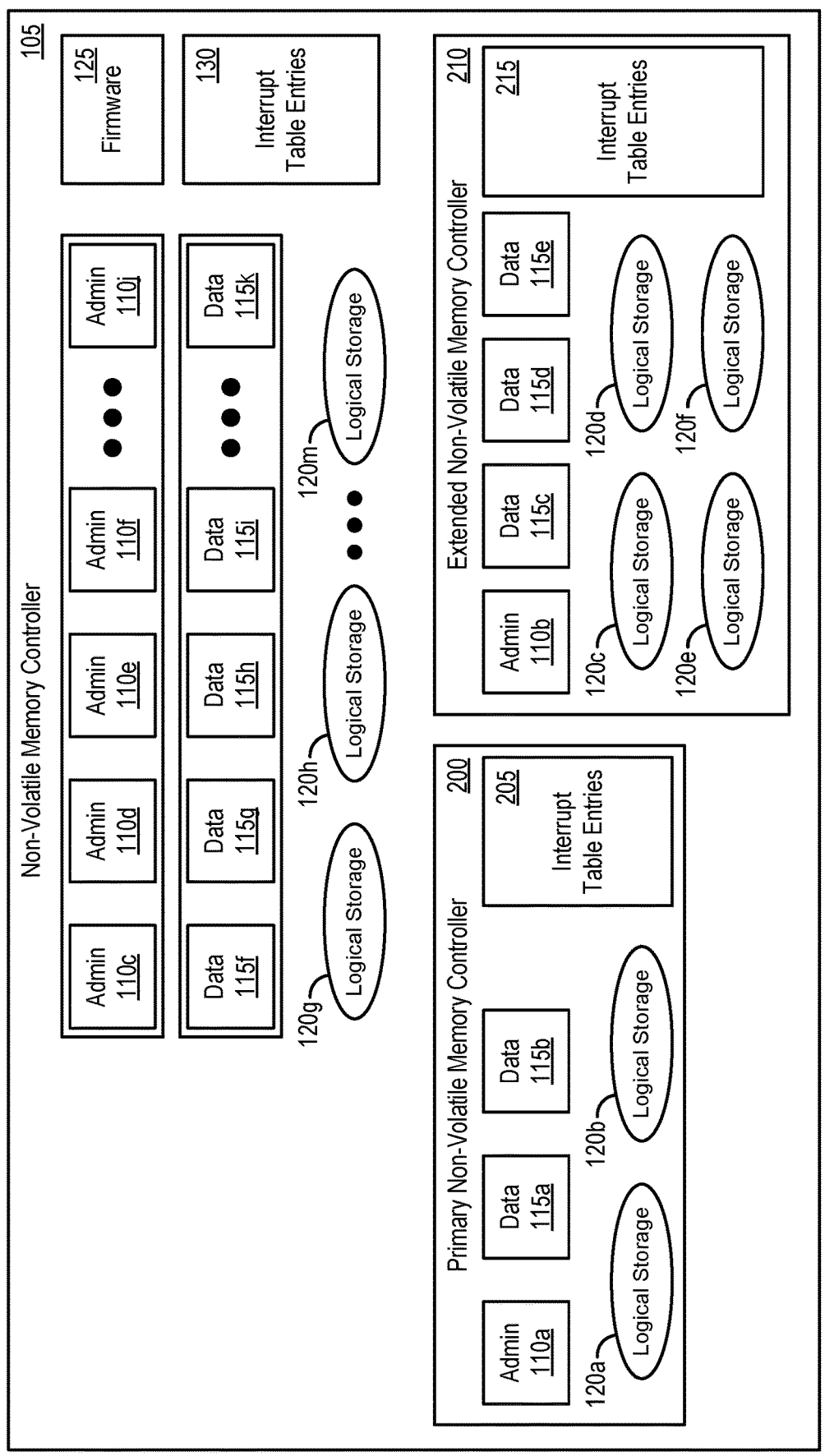
FIG. 2 illustrates non-volatile memory controllers created from the non-volatile memory controller illustrated in FIG. 1 according to some embodiments.

FIG. 2 illustrates non-volatile memory controllers created from non-volatile memory controller 105 according to some embodiments. Specifically, FIG. 2 shows primary non-volatile memory controller 200 and extended non-volatile memory controller 210 created from non-volatile memory controller 105. As shown, primary non-volatile memory controller 200 includes administrative queue 110a, data queues 115a and 115b, logical storages 120a and 120b, and interrupt table entries 205. In this example, primary non-volatile memory controller 200 is created by allocating administrative queue 110a, data queues 115a and 115b, and logical storages 120a and 120b from non-volatile memory controller 105 to primary non-volatile memory controller 200. In addition, interrupt table entries 205 includes a first interrupt table entry associated with data queue 115a and a second interrupt table entry associated with data queue 115b allocated from interrupt table entries 130. That is, interrupt table entries 205 is a subset of interrupt table entries 130. In some embodiments, primary non-volatile memory controller 200 is utilized by computing system 100 to access data in logical storages 120a and 120b.

Extended non-volatile memory controller 210 includes administrative queue 110b, data queues 115c-e, logical storages 120c-f, and interrupt table entries 215. Here, extended non-volatile memory controller 210 is created by allocating administrative queue 110b, data queues 115c-e, and logical storages 120c-f from non-volatile memory controller 105 to extended non-volatile memory controller 210. Also, interrupt table entries 215 includes a first interrupt table entry associated with data queue 115c, a second interrupt table entry associated with data queue 115d, and a third interrupt table entry associated with data queue 115e allocated from interrupt table entries 130. In other words, interrupt table entries 215 is a subset of interrupt table entries 130. Each interrupt entry in interrupt table entries 205 is different than each interrupt table entry in interrupt table entries 215. In some embodiments, extended non-volatile memory controller 210 can be utilized by a virtual machine running on computing system 100 to access data in logical storages 120c-f.

Firmware 125 manages the mappings between the non-volatile memory controllers that are created from non-volatile memory controller 105 and the administrative queues, data queues, logical storages, and interrupt table entries to which these created non-volatile memory controllers are allocated. Stated differently, firmware 125 keeps track of which administrative queues, data queues, logical storages, and interrupt table entries are allocated to each non-volatile memory controller created from non-volatile memory controller 105. Here, firmware 125 maintains mappings between primary non-volatile memory controller 200 and administrative queue 110a, data queues 115a and 115b, logical storages 120a and 120b, and interrupt table entries 205. In addition, firmware 125 maintains mappings between extended non-volatile memory controller 210 and administrative queue 110b, data queues 115c-e, logical storages 120c-f, and interrupt table entries 215. This way, firmware 125 can determine commands in a particular queue belong to which created non-volatile memory controller. Moreover, firmware 125 is able to determine what administrative queues, data queues, logical storages, and/or interrupt table entries are available to be allocated for newly created non-volatile memory controllers.

The examples described above by reference to FIGS. 1 and 2 illustrate a non-volatile memory controller that has multiple administrative queues. In some embodiments, the non-volatile memory controller may have only one administrative queue. In some such embodiments, the administrative queue is allocated to the primary non-volatile memory controller. A data queue may be repurposed as an administrative queue and allocated to the extended non-volatile memory controller. Additional extended non-volatile memory controllers can each employ a similar repurposed data queue that serves as an administrative queue.

Figure 3:
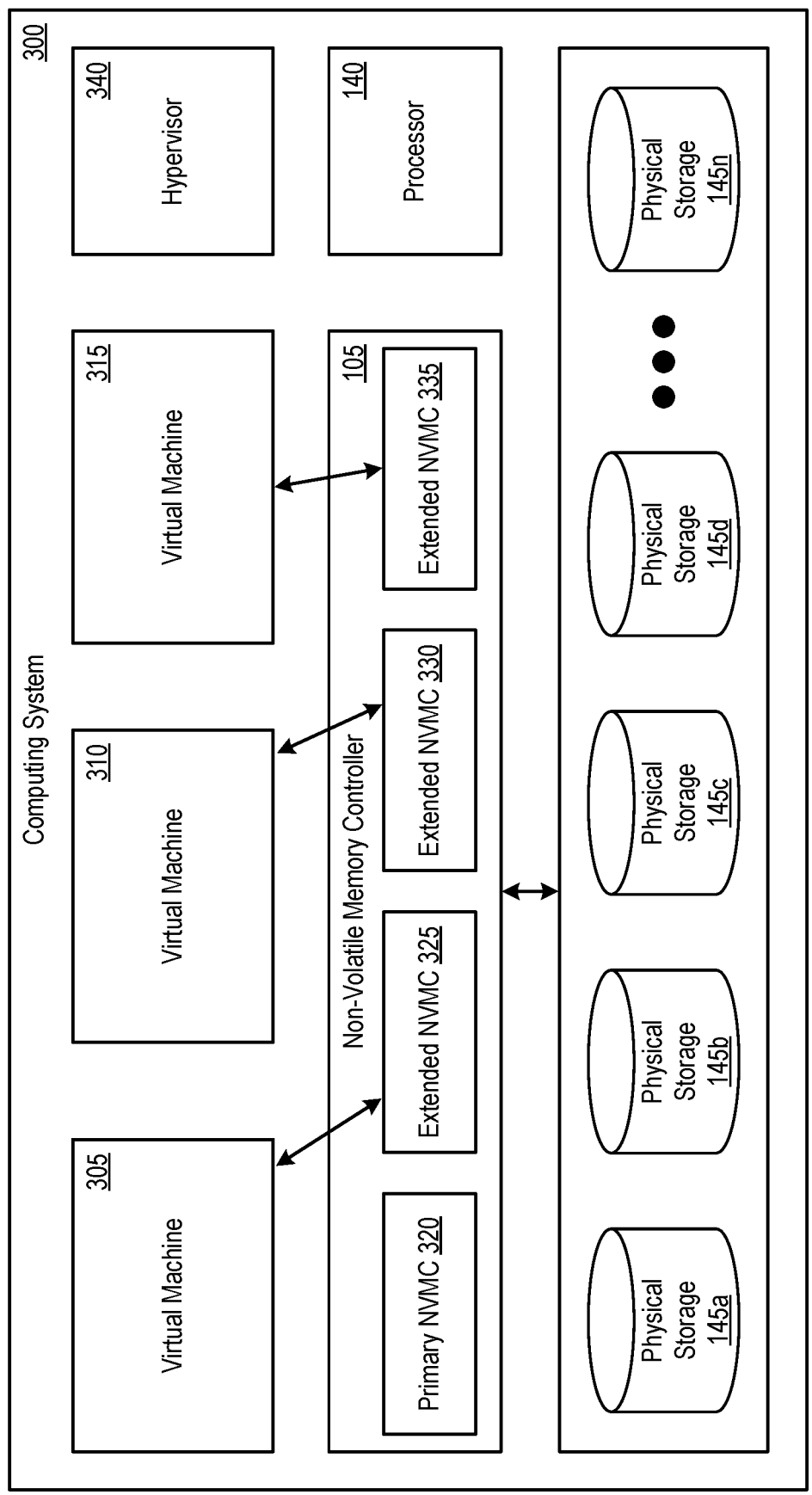
FIG. 3 illustrates a computing system with non-volatile memory controllers created for virtual machines according to some embodiments.

FIG. 2 shows how extended non-volatile memory controllers can be created from a non-volatile memory controller. One application of extended non-volatile memory controllers is utilizing them for virtual machines. FIG. 3 illustrates a computing system 300 with non-volatile memory controllers created for virtual machines according to some embodiments. As depicted in FIG. 3, computing system 300 includes virtual machines 305-315, non-volatile memory controller 105, hypervisor 340, processor 140, and physical storages 145a-n.

Each of the virtual machines 305-315 is created and managed by hypervisor 340. In some embodiments, a virtual machine is a virtualization and/or emulation of a computing system. In some such embodiments, a virtual machine includes an operating system configured to execute in the virtual machine. For this example, each of the virtual machines 305-315 also includes an extended non-volatile memory controller created from non-volatile memory controller 105. In particular, virtual machine includes extended non-volatile memory controller 325, virtual machine 310 includes extended non-volatile memory controller 330, and virtual machine 315 includes extended non-volatile memory controller 335. As such, when hypervisor 340 creates virtual machines 305-315, hypervisor 340 allocates extended non-volatile memory controller 325 to virtual machine 305, allocates extended non-volatile memory controller 330 to virtual machine 310, and allocates extended non-volatile memory controller 335 to virtual machine 315.

As illustrated in FIG. 3, non-volatile memory controller 105 includes primary non-volatile memory controller 320 and extended non-volatile memory controllers 325-335. Here, primary non-volatile memory controller 320 and extended non-volatile memory controllers 325-335 are created in the same manner as that described above by reference to FIG. 2. That is, each of the primary non-volatile memory controller 320 and extended non-volatile memory controllers 325-335 is allocated a different administrative queue 110, a set of different data queues 115, a set of different logical storages 120, and a different subset of interrupt table entries 130. Each of the primary non-volatile memory controller 320 and extended non-volatile memory controllers 325-335 provides access to their respective logical storages 120. In this example, primary non-volatile memory controller 320 provides hypervisor 340 (and other software and/or applications running on computing system 300) access to its logical storages 120. Extended non-volatile memory controller 325 provides virtual machine 305 access to its logical storages 120, extended non-volatile memory controller 330 provides virtual machine 310 access to its logical storages 120, and extended non-volatile memory controller 335 provides virtual machine 315 access to its logical storages 120.

Figure 4:
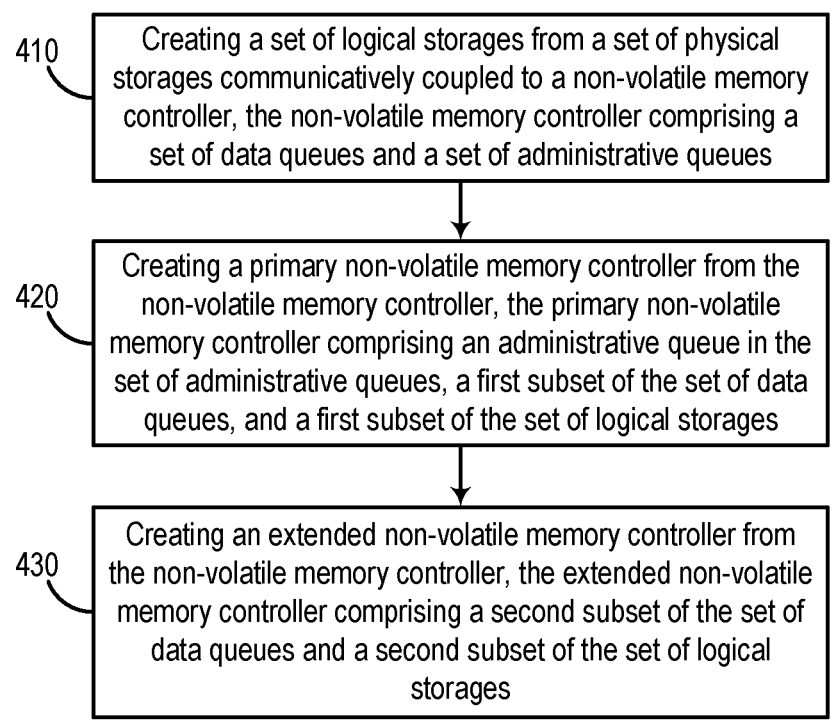
FIG. 4 illustrates a process for configuring a non-volatile memory controllers according to some embodiments.

FIG. 4 illustrates a process 400 for configuring a non-volatile memory controllers according to some embodiments. In some embodiments, non-volatile memory controller 105 performs process 400. Process 400 begins by creating, at 410, a set of logical storages from a set of physical storages communicatively coupled to a non-volatile memory controller. The non-volatile memory controller comprises a set of data queues and a set of administrative queues. Referring to FIG. 1 as an example, non-volatile memory controller 105 creates logical storages 120a-m from physical storages 145a-n.

Next, process 400 creates, at 420, a primary non-volatile memory controller from the non-volatile memory controller. The primary non-volatile memory controller comprises an administrative queue in the set of administrative queues, a first subset of the set of data queues, and a first subset of the set of logical storages. Referring to FIG. 2 as an example, non-volatile memory controller 105 creates primary non-volatile memory controller 200 from resources in non-volatile memory controller 105.

Finally, process 400 creates, at 430, an extended non-volatile memory controller from the non-volatile memory controller. The extended non-volatile memory controller comprising a second subset of the set of data queues and a second subset of the set of logical storages. Referring to FIG. 2 as an example, non-volatile memory controller 105 creates extended non-volatile memory controller 210 from resources in non-volatile memory controller 105.

Figure 5:
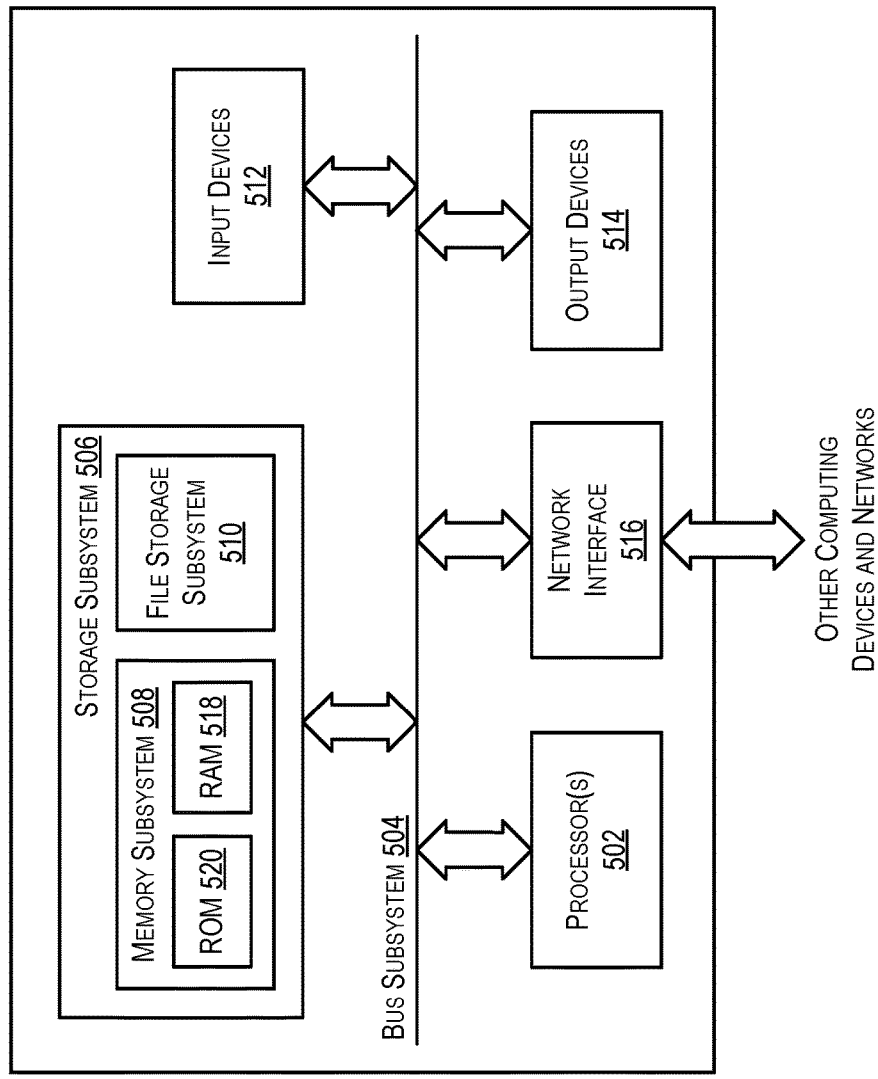
FIG. 5 depicts a simplified block diagram of an example computer system according to some embodiments.

FIG. 5 depicts a simplified block diagram of an example computer system 500, which can be used to implement the techniques described in the foregoing disclosure. For example, computer system 500 may be used to implement computing system 100. As shown in FIG. 5, computer system 500 includes one or more processors 502 that communicate with a number of peripheral devices via a bus subsystem 504. These peripheral devices may include a storage subsystem 506 (e.g., comprising a memory subsystem 508 and a file storage subsystem 510) and a network interface subsystem 516. Some computer systems may further include user interface input devices 512 and/or user interface output devices 514.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., Ethernet, a Wi-Fi and/or cellular adapter, a modem (telephone, satellite, cable, ISDN, etc.), digital subscriber line (DSL) units, and/or the like.

Storage subsystem 506 includes a memory subsystem 508 and a file/disk storage subsystem 510. Subsystems 508 and 510 as well as other memories described herein are examples of non-transitory computer-readable storage media that can store executable program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Further Example Embodiments

In various embodiments, the present disclosure includes systems, methods, and apparatuses for providing a scalable controller for managing data storages. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system including: a non-volatile memory controller including a set of data queues and a set of administrative queues; and a set of physical storages communicatively coupled to the non-volatile memory controller, wherein a set of logical storages are created from the set of physical storages, wherein a primary non-volatile memory controller is created from the non-volatile memory controller, the primary non-volatile memory controller including an administrative queue in the set of administrative queues, a first subset of the set of data queues, and a first subset of the set of logical storages, and wherein an extended non-volatile memory controller is created from the non-volatile memory controller, the extended non-volatile memory controller including a second subset of the set of data queues and a second subset of the set of logical storages.

In some embodiments, the system further includes a processor communicatively coupled to the non-volatile memory controller, wherein the non-volatile memory controller further includes a set of interrupt table entries, wherein each interrupt table entry in the set of interrupt table entries includes a message configured to be transmitted to the processor and instructions for the processor to execute a device driver associated with non-volatile memory controller.

In some embodiments, each data queue in the set of data queues is associated with an interrupt table entry in the set of interrupt table entries.

In some embodiments, an operating system executing in the system generates, for each interrupt table entry in the set of interrupt table entries, the message and the instructions and stores the message and the instructions in the interrupt table entry.

In some embodiments, a hypervisor executing in the system generates, for each interrupt table entry in the set of interrupt table entries, the message and the instructions and stores the message and the instructions in the interrupt table entry.

In some embodiments, when the primary non-volatile memory controller stores a completion command in a data queue in the first subset of the set of data queues, the primary non-volatile memory controller is configured to send the processor, the message and the instructions in the interrupt table entry associated with the data queue.

In some embodiments, the administrative queue is a first administrative queue, wherein a data queue in the second subset of the set of data queues is configured as a second administrative queue in the extended non-volatile memory controller.

In some embodiments, the administrative queue is a first administrative queue, wherein the extended non-volatile memory controller further includes a second administrative queue in the set of administrative queues.

In some embodiments, the administrative queue in the set of administrative queues is configured to receive a set of administrative commands for the primary non-volatile memory controller.

In some embodiments, each data queue in the first subset of the set of data queues is configured to receive input/output (I/O) commands for the primary non-volatile memory controller.

In some embodiments, each data queue in the first subset of the set of data queues is different than each data queue in the second subset of the set of data queues.

In some embodiments, each logical storage in the first subset of the set of logical storages is different than each logical storage in the second subset of the set of logical storages.

In some embodiments, firmware executing in the non-volatile memory controller is configured to manage mappings between the administrative queue in the set of administrative queues and the primary non-volatile memory controller; the first subset of the set of data queues and the primary non-volatile memory controller; and the first subset of the set of logical storages and the primary non-volatile memory controller.

In some embodiments, the firmware is further configured to manage mappings between the second subset of the set of data queues and the extended non-volatile memory controller; and the second subset of the set of logical storages and the extended non-volatile memory controller.

In some embodiments, the present disclosure includes a method including: creating a set of logical storages from a set of physical storages communicatively coupled to a non-volatile memory controller, the non-volatile memory controller including a set of data queues and a set of administrative queues; creating a primary non-volatile memory controller from the non-volatile memory controller, the primary non-volatile memory controller including an administrative queue in the set of administrative queues, a first subset of the set of data queues, and a first subset of the set of logical storages, and creating an extended non-volatile memory controller from the non-volatile memory controller, the extended non-volatile memory controller including a second subset of the set of data queues and a second subset of the set of logical storages.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
    creating a set of virtual disks from a set of physical storages communicatively coupled to a non-volatile memory controller, the non-volatile memory controller comprising a set of data queues and a set of administrative queues;

creating a primary non-volatile memory controller from the non-volatile memory controller, the primary non-volatile memory controller comprising an administrative queue in the set of administrative queues and a first subset of the set of data queues; and creating an extended non-volatile memory controller from the non-volatile memory controller, the extended non-volatile memory controller comprising a second subset of the set of data queues, wherein the non-volatile memory controller further comprises a set of interrupt table entries, wherein each interrupt table entry in the set of interrupt table entries comprises a message configured to be transmitted to a processor communicatively coupled to the non-volatile memory controller and instructions for the processor to execute a device driver associated with the non-volatile memory controller.

2. The method of claim 1, wherein the administrative queue is a first administrative queue, wherein a data queue in the second subset of the set of data queues is configured as a second administrative queue in the extended non-volatile memory controller.

3. The method of claim 1, wherein the administrative queue is a first administrative queue, wherein the extended non-volatile memory controller further comprises a second administrative queue in the set of administrative queues.

4. The method of claim 1, wherein firmware executing in the non-volatile memory controller is configured to manage mappings between the administrative queue in the set of administrative queues and the primary non-volatile memory controller; and the first subset of the set of data queues and the primary non-volatile memory controller.

5. The method of claim 4, wherein the firmware is further configured to manage mappings between the second subset of the set of data queues and the extended non-volatile memory controller.

6. The method of claim 1, further comprising creating another extended non-volatile memory controller from the non-volatile memory controller, the another extended non-volatile memory controller comprising a third subset of the set of data queues.

7. The system of claim 1, wherein the administrative queue in the set of administrative queues is configured to receive a set of administrative commands for the primary non-volatile memory controller.

8. A system comprising:
a non-volatile memory controller comprising a set of data queues and a set of administrative queues; and
a set of physical storages communicatively coupled to the non-volatile memory controller,
wherein a set of virtual disks are created from the set of physical storages,
wherein a primary non-volatile memory controller is created from the non-volatile memory controller, the primary non-volatile memory controller comprising an administrative queue in the set of administrative queues and a first subset of the set of data queues,
wherein an extended non-volatile memory controller is created from the non-volatile memory controller, the extended non-volatile memory controller comprising a second subset of the set of data queues, and wherein the system further comprises a processor communicatively coupled to the non-volatile memory controller, wherein the non-volatile memory controller further comprises a set of interrupt table entries, wherein each interrupt table entry in the set of interrupt table entries comprises a message configured to be transmitted to the processor and instructions for the processor to execute a device driver associated with the non-volatile memory controller.

9. The system of claim 8, wherein each data queue in the set of data queues is associated with an interrupt table entry in the set of interrupt table entries.

10. The system of claim 8, wherein an operating system executing in the system generates, for each interrupt table entry in the set of interrupt table entries, the message and the instructions and stores the message and the instructions in the interrupt table entry.

11. The system of claim 8, wherein a hypervisor executing in the system generates, for each interrupt table entry in the set of interrupt table entries, the message and the instructions and stores the message and the instructions in the interrupt table entry.

12. The system of claim 8, wherein when the primary non-volatile memory controller stores a completion command in a data queue in the first subset of the set of data queues, the primary non-volatile memory controller is configured to send the processor, the message and the instructions in the interrupt table entry associated with the data queue.

13. The system of claim 8, wherein the administrative queue is a first administrative queue, wherein a data queue in the second subset of the set of data queues is configured as a second administrative queue in the extended non-volatile memory controller.

14. The system of claim 8, wherein the administrative queue is a first administrative queue, wherein the extended non-volatile memory controller further comprises a second administrative queue in the set of administrative queues.

15. The system of claim 8, wherein the administrative queue in the set of administrative queues is configured to receive a set of administrative commands for the primary non-volatile memory controller.

16. The system of claim 8, wherein each data queue in the first subset of the set of data queues is configured to receive input/output (I/O) commands for the primary non-volatile memory controller.

17. The system of claim 8, wherein each data queue in the first subset of the set of data queues is different than each data queue in the second subset of the set of data queues.

18. The system of claim 8, wherein firmware executing in the non-volatile memory controller is configured to manage mappings between the administrative queue in the set of administrative queues and the primary non-volatile memory controller.

19. The system of claim 18, wherein the firmware is further configured to manage mappings between the second subset of the set of data queues and the extended non-volatile memory controller.

20. The system of claim 8, wherein another extended non-volatile memory controller is created from the non-volatile memory controller, the another extended non-volatile memory controller comprising a third subset of the set of data queues.

* * * * *